United States Patent
Shahana

(10) Patent No.: US 9,334,020 B2
(45) Date of Patent: May 10, 2016

(54) BICYCLE COMPONENT POSITIONING DEVICE

(75) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 1825 days.

(21) Appl. No.: 11/740,514

(22) Filed: Apr. 26, 2007

(65) Prior Publication Data
US 2008/0264197 A1  Oct. 30, 2008

(51) Int. Cl.
| | | |
|---|---|---|
| B62M 25/04 | (2006.01) |
| B62M 9/12 | (2006.01) |
| B62K 23/06 | (2006.01) |
| B62M 9/1246 | (2010.01) |
| B62M 9/1346 | (2010.01) |

(52) U.S. Cl.
CPC .............. *B62M 25/04* (2013.01); *B62K 23/06* (2013.01); *B62M 9/12* (2013.01); *B62M 9/1246* (2013.01); *B62M 9/1346* (2013.01); *Y10T 74/20396* (2015.01); *Y10T 74/20438* (2015.01)

(58) Field of Classification Search
CPC ............ B62M 9/12; F16C 1/10; G05G 11/00; G05G 13/00
USPC ......... 74/502.2, 488, 489, 575, 577 R, 473.4, 74/576, 577 S, 577 SF, 577 M, 473.14, 74/473.15, 540, 541; 474/78–83
See application file for complete search history.

(56) References Cited

U.S. PATENT DOCUMENTS

| | | | |
|---|---|---|---|
| 1,442,003 A * | 1/1923 | Rohrer ........................ 74/577 S |
| 5,012,692 A | 5/1991 | Nagano |
| 5,044,213 A | 9/1991 | Nagano |
| 5,095,768 A | 3/1992 | Nagano |
| 5,102,372 A | 4/1992 | Patterson et al. |
| 5,203,213 A * | 4/1993 | Nagano ....................... 74/473.14 |
| 5,222,412 A | 6/1993 | Nagano |
| 5,588,331 A | 12/1996 | Huang et al. |
| 5,666,859 A | 9/1997 | Arbeiter et al. |
| 5,673,594 A * | 10/1997 | Huang et al. ............... 74/473.13 |
| 5,730,030 A | 3/1998 | Masui |
| 5,755,139 A | 5/1998 | Kojima |
| 5,799,542 A | 9/1998 | Yamane |
| 5,904,069 A * | 5/1999 | Rau et al. .................... 74/473.14 |
| 5,921,139 A | 7/1999 | Yamane |
| 6,066,057 A | 5/2000 | Nakamura et al. |
| 6,135,906 A | 10/2000 | Ichida |
| 6,145,407 A | 11/2000 | Rottmann |

(Continued)

FOREIGN PATENT DOCUMENTS

| | | |
|---|---|---|
| DE | 9015515 U1 | 5/1991 |
| EP | 0 507 240 A1 | 10/1992 |

(Continued)

*Primary Examiner* — Daniel Yabut
(74) *Attorney, Agent, or Firm* — Global IP Counselors

(57) ABSTRACT

A bicycle component positioning device is basically provided with a fixed structure, a positioning member, a first restricting member and a second restricting member. The positioning member is movably coupled with respect to the fixed structure. The first restricting member is operatively engaged with the positioning member to only restrict movement of the positioning member in a first moving direction when the positioning member is in one of predetermined positions. The second restricting member is operatively engaged with the positioning member to only restrict movement of the positioning member in a second moving direction when the positioning member is in one of predetermined positions.

19 Claims, 12 Drawing Sheets

(56) References Cited

U.S. PATENT DOCUMENTS

| | | | |
|---|---|---|---|
| 6,467,368 B1 | 10/2002 | Feng et al. | |
| 6,553,860 B2 | 4/2003 | Blaschke | |
| 6,629,903 B1 * | 10/2003 | Kondo | 474/82 |
| 6,729,203 B2 * | 5/2004 | Wesling et al. | 74/502.2 |
| 6,810,764 B2 | 11/2004 | Chen | |
| 6,862,948 B1 | 3/2005 | Calendrille, Jr. | |
| 6,877,393 B2 | 4/2005 | Takachi | |
| 6,993,995 B2 | 2/2006 | Fujii | |
| 7,152,497 B2 | 12/2006 | Sato et al. | |
| 2002/0112559 A1 | 8/2002 | Liu | |
| 2002/0144566 A1 | 10/2002 | Liu et al. | |
| 2004/0005947 A1 | 1/2004 | Shahana et al. | |
| 2005/0034554 A1 | 2/2005 | Hou | |
| 2005/0193856 A1 | 9/2005 | Dal Pra et al. | |
| 2006/0053941 A1 | 3/2006 | Dal Pra et al. | |
| 2006/0096404 A1 | 5/2006 | Wessel et al. | |
| 2006/0130602 A1 | 6/2006 | Kawakami | |
| 2006/0207375 A1 | 9/2006 | Jordan et al. | |
| 2006/0260427 A1 | 11/2006 | Tsumiyama | |
| 2007/0017316 A1 | 1/2007 | Tsumiyama | |

FOREIGN PATENT DOCUMENTS

| | | |
|---|---|---|
| EP | 1 445 184 A2 | 8/2004 |
| EP | 1 783 043 A2 | 5/2007 |
| JP | 48-37835 | 6/1973 |
| JP | 51-18046 | 2/1976 |
| JP | 51-28934 | 3/1976 |
| JP | 51-43541 | 4/1976 |
| JP | 51-50141 | 5/1976 |
| JP | 52-15033 | 2/1977 |
| JP | 53-98644 | 8/1978 |
| JP | 54-15241 | 2/1979 |
| JP | 55-25693 | 2/1980 |

* cited by examiner

BICYCLE COMPONENT POSITIONING DEVICE

BACKGROUND OF THE INVENTION

1. Field of the Invention

This invention generally relates to a bicycle component positioning device. More specifically, the present invention relates to a bicycle component positioning device for a bicycle component such as a derailleur or shifter, which has the same relatively easy action when moved in two opposite directions, yet is reliably retained.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle such as derailleurs and shifters.

A bicycle derailleur basically includes a base, a chain guide and a linkage coupled between the base and the chain guide to move the chain guide between various shift positions. The base is fixed to the bicycle frame. A spring is arranged to bias the chain guide in one lateral direction relative to the base. A control cable is used to move the chain guide against the biasing force of the spring when pulled, and to allow the bias force of the spring to move the chain guide in an opposite direction when the cable is released. A shifter is attached to the cable to selectively pull/release the cable to move the chain guide laterally back and forth respectively. With these conventional derailleurs, shifting is not always as smooth and reliable as desired by some riders. Moreover, the control cable is always held in tension by the spring, which leads to continued cable stretching. Continued cable stretching leads to frequent adjustment of the derailleur and/or shifter or minor misalignment of the derailleur. Furthermore, conventional derailleurs can be relatively complicated and expensive to manufacture, assemble, to mount to the bicycle and/or adjust.

The shifter for controlling conventional derailleurs typically utilize one or more levers coupled to a winding member to selectively pull/release the cable. The winding member is retained in various shift positions by a retaining structure, friction or the like. Optionally, some shifters further include an indexing mechanism with a plurality of positions corresponding to the number of shift positions. In any case, a sufficient retaining force must be applied to the winding member to prevent undesired movement of the chain guide of the derailleur due to the biasing force of the derailleur spring. Thus, a relatively strong retaining force must be provided, which can be relatively difficult to overcome when moving the lever(s). Additionally, when the shifting device is actuated to wind the cable, an even stronger force is often required than during an unwinding operating due to the derailleur biasing member. In either case, the shifting action(s) may feel awkward to some individuals. Also, with these conventional shifters, shifting is not always as smooth and reliable as desired by some riders. Moreover, conventional shifters can be relatively complicated and expensive to manufacture, assemble, to mount to the bicycle and/or adjust.

In view of the above, it will be apparent to those skilled in the art from this disclosure that there exists a need for an improved bicycle component positioning device. This invention addresses this need in the art as well as other needs, which will become apparent to those skilled in the art from this disclosure.

SUMMARY OF THE INVENTION

One object of the present invention is to provide a bicycle component positioning device, which moves smoothly and reliably, yet is reliably retained in different positions.

Another object of the present invention is to provide a bicycle component positioning device, which is relatively simple and inexpensive to manufacture and/or assemble.

The foregoing objects can basically be attained by providing a bicycle component positioning device, which comprises a fixed structure, a positioning member, a first restricting member and a second restricting member. The positioning member is movably coupled with respect to the fixed structure. The first restricting member is operatively engaged with the positioning member to only restrict movement of the positioning member in a first moving direction when the positioning member is in one of predetermined positions. The second restricting member is operatively engaged with the positioning member to only restrict movement of the positioning member in a second moving direction when the positioning member is in one of predetermined positions.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
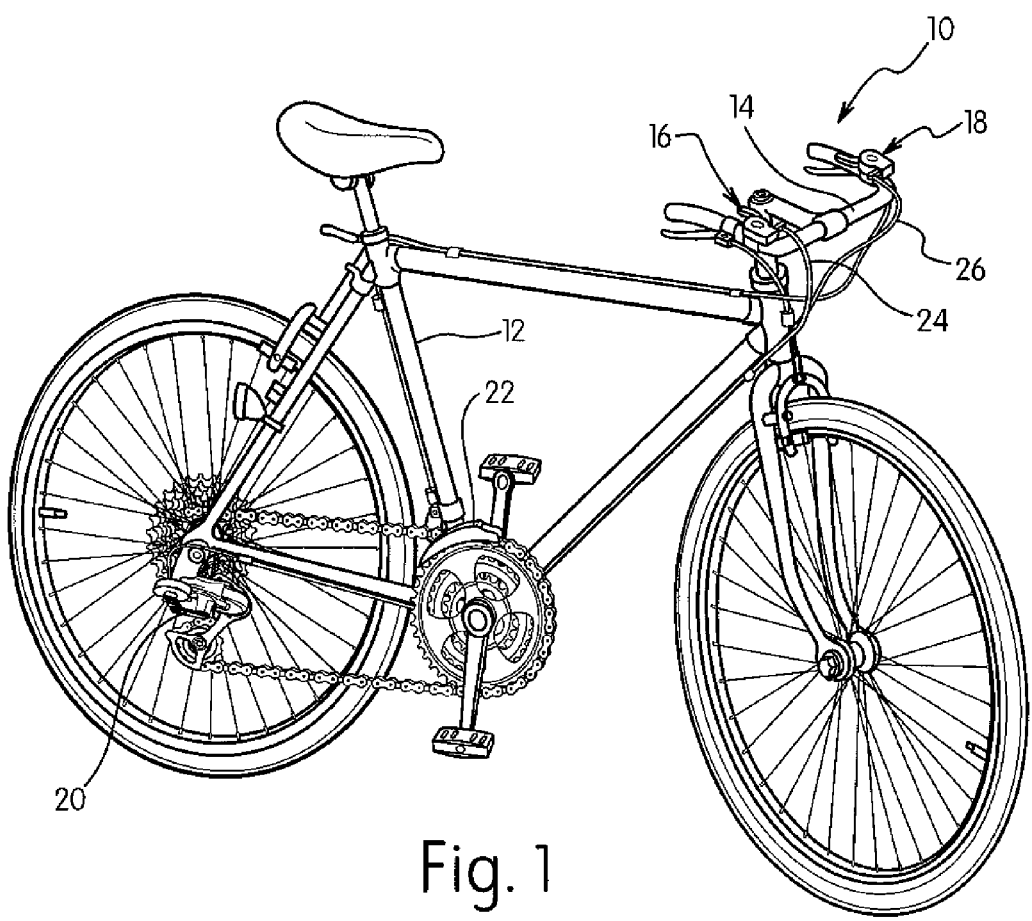
FIG. 1 is a side elevational view of a bicycle equipped with a front shifting system in accordance with the present invention.

Referring initially to FIG. 1, a bicycle 10 is illustrated with a front shifting system and a rear shifting system coupled thereto in accordance with the present invention. The bicycle 10 includes, among other things, a frame 12 with a handle bar 14. The handle bar 14 has a right-hand shifter 16 mounted on a right-hand side and a left-hand shifter 18 mounted on a right-hand side. The frame 12 has a rear derailleur 20 mounted a rear part of the chain stay and a front derailleur 22 mounted to the seat tube. The right-hand shifter 16 is operatively coupled to the rear derailleur 20 by a control cable 24, while the left-hand shifter 18 is operatively coupled to the front derailleur 22 by a control cable 26. Of course, the rear derailleur 20 could be controlled by a left-hand shifter and the front derailleur 22 could be controlled by a right-hand shifter if needed and/or desired.

Figure 2:
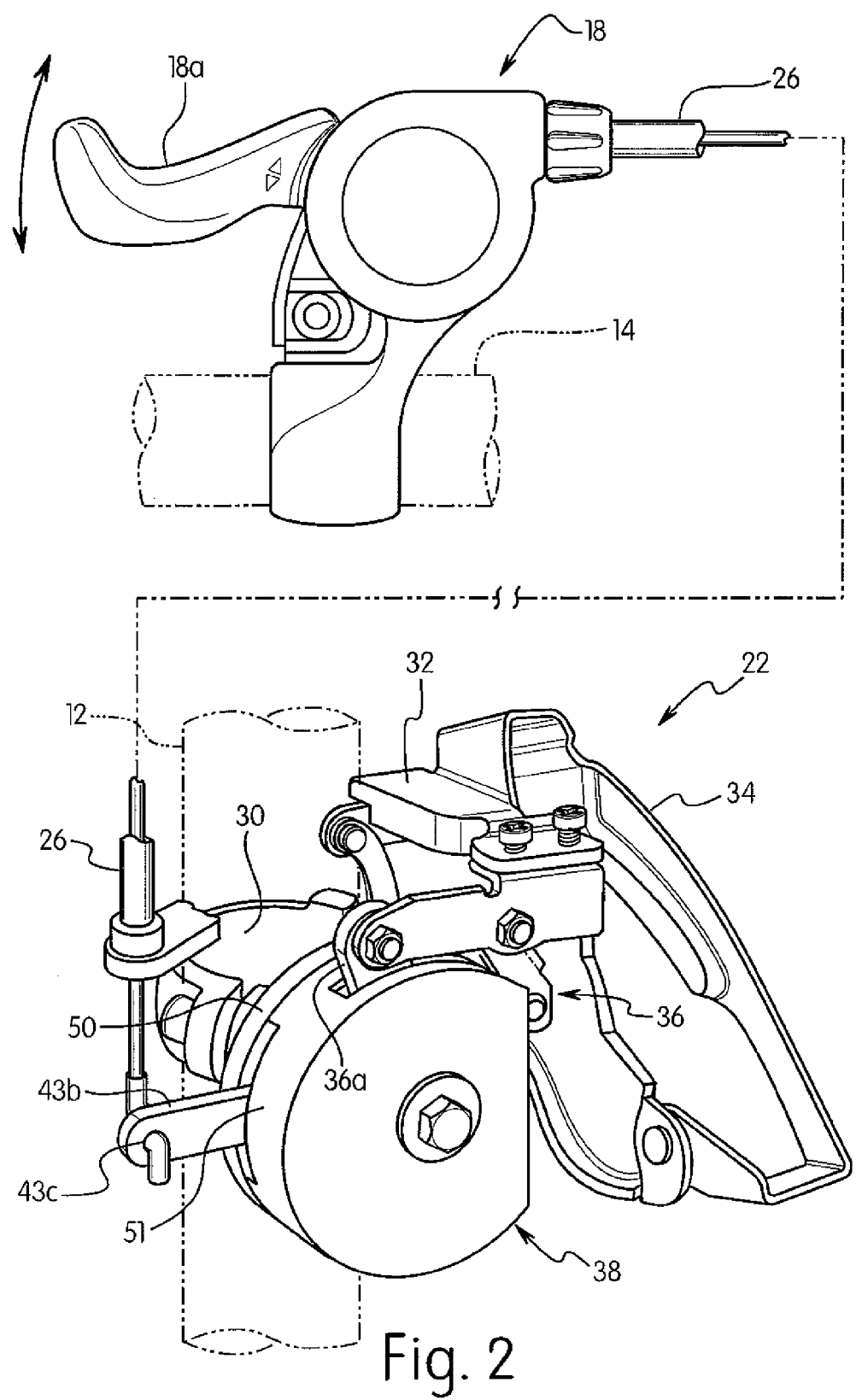
FIG. 2 is a schematic view of the front shifting system illustrated in FIG. 1, with a conventional front shifter shown in top plan and a front derailleur that is equipped with a bicycle component positioning device in accordance with the present invention shown in rear perspective.
Figure 3:
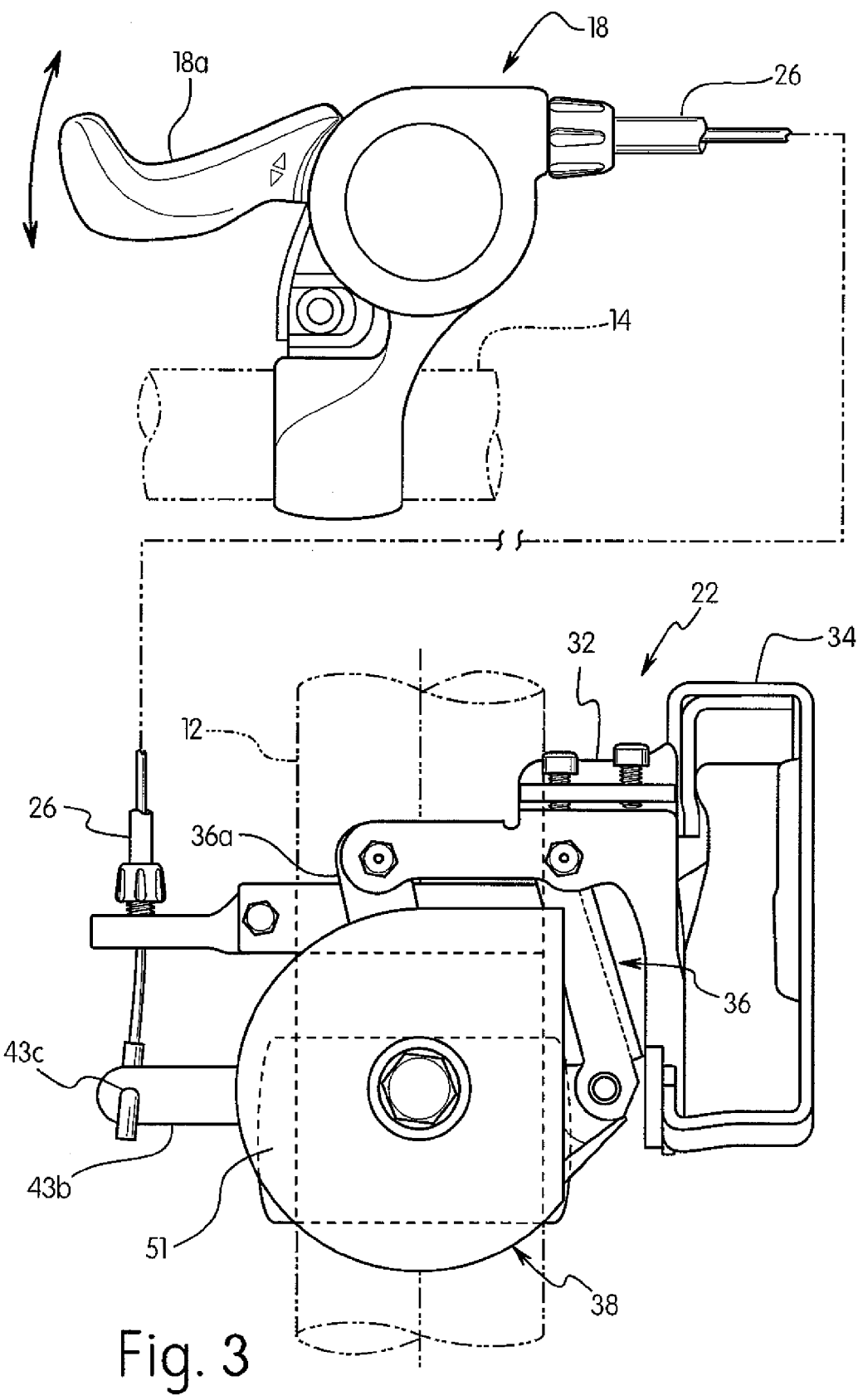
FIG. 3 is a schematic view of the front shifting system illustrated in FIG. 1, with the conventional front shifter shown in top plan and the front derailleur of the present invention shown in rear elevation when the chain guide in a retracted position.
Figure 4:
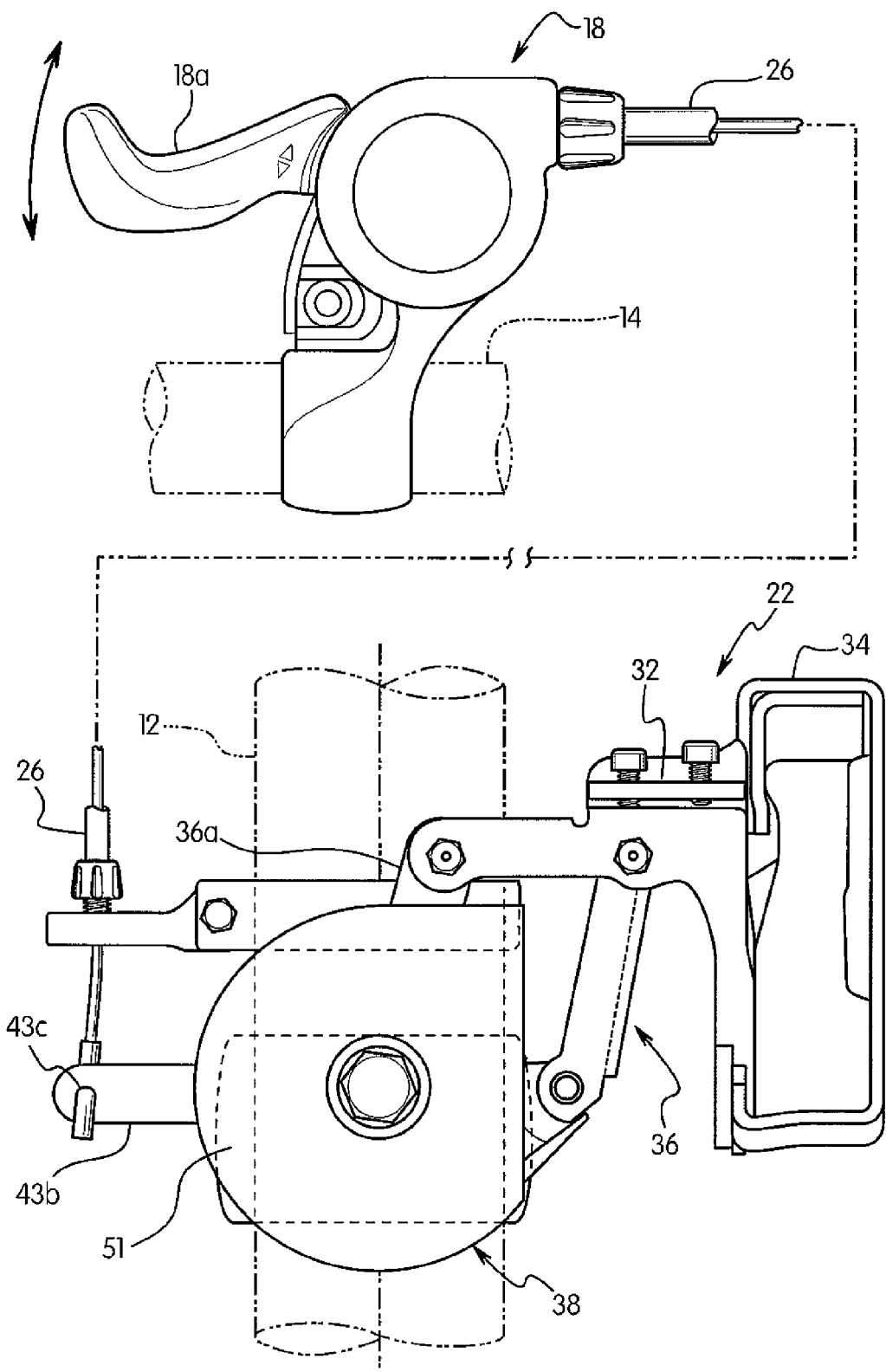
FIG. 4 is a schematic view of the front shifting system illustrated in FIG. 1, with the conventional front shifter shown in top plan and the front derailleur of the present invention shown in rear elevation when the chain guide in a fully extended position.

Now referring to FIGS. 2 to 4, the front derailleur 20 basically includes a base member 30, a movable member 32 supporting a chain guide 34, a linkage mechanism 36 and a bicycle component positioning device 38. The front derailleur 20 is basically a conventional front derailleur, except for the addition of the positioning device 38 that is operated by the shifter 18. Thus, the front derailleur 20 will only not be discussed and/or illustrated in detail. The shifter 18 is a simple operating member that has a rider operable shift lever 18a. The shift lever 18a is pivotally mounted in a housing for rotational movement in both directions. The shift lever 18a is connected to one end of the control cable 26. In this illustrated embodiment, the control cable 26 is a solid wire type that pushes and pulls the bicycle component positioning device 38. The bicycle component positioning device 38 maintains the shift lever 18a in a center neutral position such that the shift lever 18a has a trigger action, as a result the control cable 26 also returns to its initial (neutral) position when the shift lever 18a returns to the neutral position.

While the control cable 26 is illustrated as a relative rigid cable in a longitudinal direction and relatively flexible in a transverse direction so that the control cable 26 can transmit a pushing force and a pull force between the shifter 18 and the derailleur 22, it will be apparent to those skilled in the art that other types of shifters can be used with the bicycle component positioning device 38 of the present invention. Alternatively, the bicycle component positioning device 38 can be operatively connected to a shifter by a pair of cables such that one of the cables is pulled in a first operating direction to operate the bicycle component positioning device 38 and the other one of the cables is pulled in a second operating direction to operate the bicycle component positioning device 38. Furthermore, the bicycle component positioning device 38 can alternatively be operatively connected to a hydraulic or pneumatic operated shifter. In other words, the present invention can be used with a hydraulic actuating system or a pneumatic actuating system instead of a cable operated system. Thus, hydraulic or pneumatic lines constitute derailleur operating members that can operatively connect the bicycle component positioning device 38 to one of a shifter.

Basically, the base member 30 is attachable to the seat tube of the bicycle frame 12 in a conventional manner. For example, the base member 30 is preferably a band clamp. However, other mounting arrangements are possible. For example, the base member 30 can be attached to braze-on connections or mounted to the bottom bracket, if needed and/or desired. The movable member 32 is pivotally attached to the linkage mechanism 36 to support the chain guide 34 for laterally movement between an innermost or retracted position to an outermost or extended position with respect to the frame 12. The linkage mechanism 36 is arranged between the base member 30 and the movable member 32 to create a four-bar linkage with the base member 30 and the movable member 32 so that the chain guide 34 moves laterally relative to the base member 30. Thus, the chain guide 34 serves as an output member that is operatively coupled to the positioning device 38 to move in response to movement of the positioning device 38 due to operation of the shifter 18.

While the positioning device 38 is illustrated as part of the front derailleur 22, it will be apparent to those skilled in the art that the positioning device 38 of the present invention can be adapted to the rear derailleur 20. In other words, the construction of the bicycle component positioning device 38 can be applied to the rear derailleur 20. Thus, the positioning device of the rear derailleur 20 will not be discussed and/or illustrated in detail.

As seen in FIGS. 3 and 4, the positioning device 38 is coupled to a link member 36a of the linkage mechanism 36 for moving the linkage mechanism 36 between the innermost or retracted position (FIG. 3) to the outermost or extended position (FIG. 4) with respect to the frame 12. The positioning device 38 can also maintain the chain guide 34 in a middle or intermediate position (not shown). Thus, the positioning device 38 firmly positions the chain guide 34 in one of a plurality of operating positions.

Figures 5, 6:
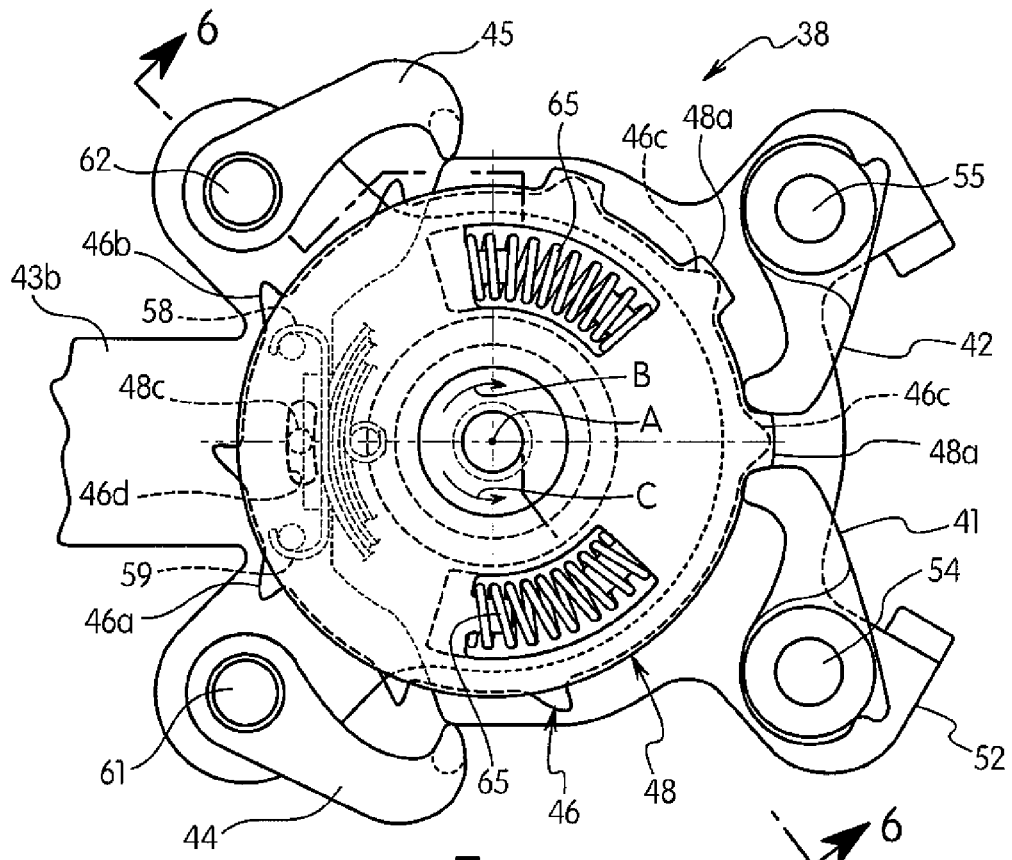
FIG. 5 is a simplified top plan view of selected parts of the bicycle component positioning device that is used with the front derailleur of the present invention.
FIG. 6 is a cross sectional view of selected parts of the bicycle component positioning device as seen along section line 6-6 of FIG. 5.
Figure 7:
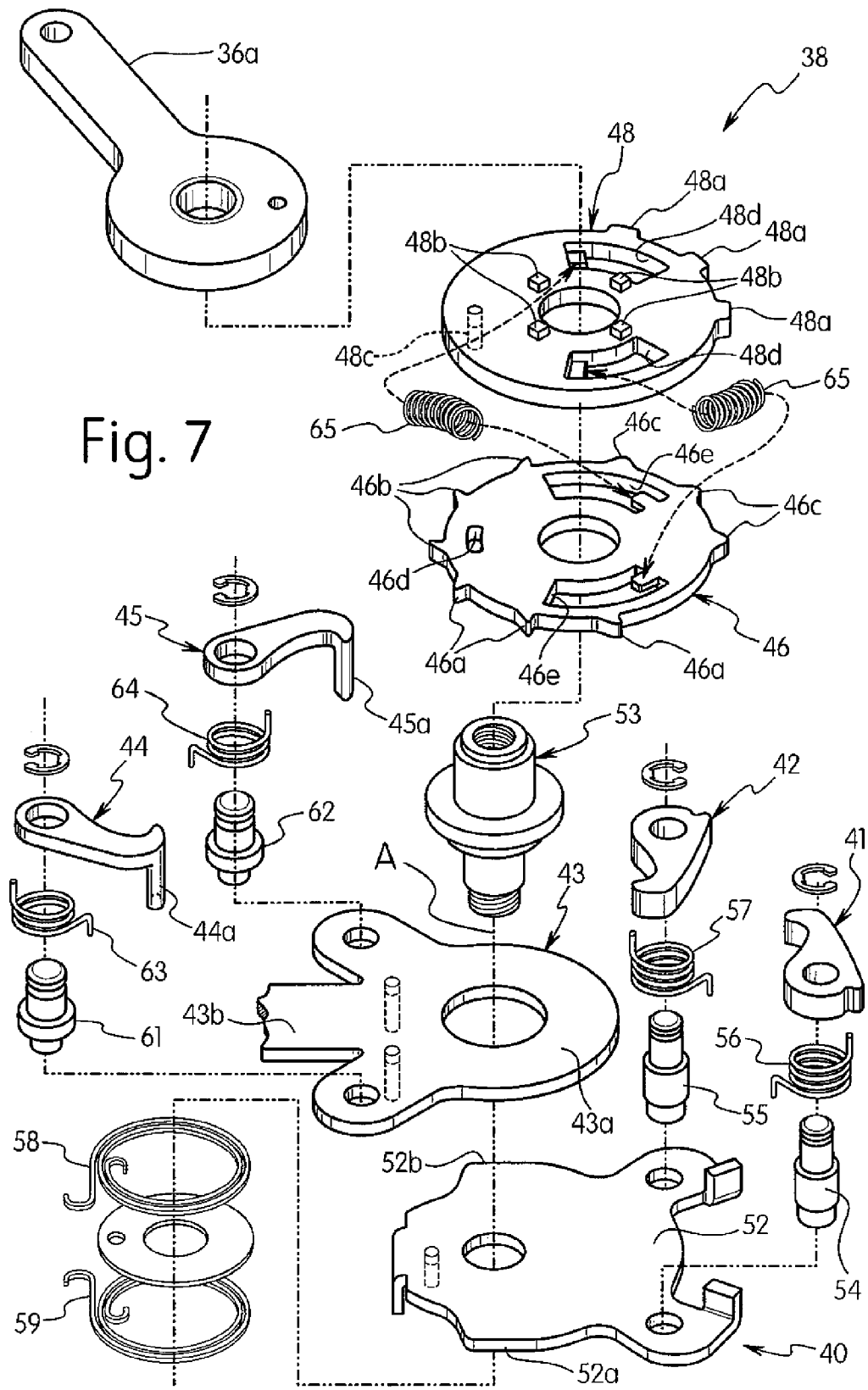
FIG. 7 is an exploded perspective view of selected parts of the bicycle component positioning device that is used with the front derailleur of the present invention.

As seen in FIGS. 5 to 7, the positioning device 38 basically includes a fixed structure 40, a first restricting member or pawl 41, a second restricting member or pawl 42, an input or operating member 43, a first release pawl 44, a second release pawl 45, a release member or plate 46 and a positioning member or plate 48. When the positioning device 38 is in a rest position, the restricting pawls 41 and 42 engage a positioning plate 48 in both circumferential directions to restrict movement of the positioning plate 48 about a main pivot axis A in both a first moving direction B and a second moving direction C that is opposite the first moving direction B. Therefore, the positioning plate 48 is not movable in both directions so that a strong positioning effect is achieved. In other words, in the positioning device 38 of the front derailleur 22, since the positioning plate 48 is fixed to the link member 36a, the positioning of the chain guide 34 is very reliably maintained.

The fixed structure 40 basically includes a first housing part 50, a second housing part 51, a mounting plate 52 and a main pivot axle 53. The first and second housing parts 50 and 51 form an enclosure with the first housing part 50 being fixed to the base member 30. The mounting plate 52 is non-movably mounted within the first and second housing parts 50 and 51. The main pivot axle 53 defines the main pivot axis A of the fixed structure 40 with the input member 43, the release plate 46 and the positioning plate 48 being mounted to rotate about the main pivot axis A in the first and second moving directions B and C.

The first and second restricting members or pawls 41 and 42 are pivotally mounted to the mounting plate 52 of the fixed structure 40 by first and second mounting pins 54 and 55, respectively. The first restricting pawl 41 is biased in a counterclockwise direction in FIG. 5 about the first mounting pin 54 to normally contact the release plate 46 and the positioning plate 48 by a torsion spring 56 when the input member 43 is in the neutral rest position. The second restricting pawl 42 is biased in a clockwise direction in FIG. 5 about the second mounting pin 55 to normally contact the release plate 46 and the positioning plate 48 by a torsion spring 57 when the input member 43 is in the neutral rest position.

The input or operating member 43 is pivotally mounted on the main pivot axle 53 of the fixed structure 40 such that it pivots about the main pivot axis A. In other words, the input member 43 is movably coupled with respect to the fixed structure 40 to move in the first and second moving directions B and C from the neutral rest position. The input member 43 is preferably biased to a stationary neutral or rest position with respect to the fixed structure 40. In particular, a biasing arrangement is provided that includes a pair of torsion springs 58 and 59 arranged between the input member 43 and the mounting plate 52. The torsion springs 58 and 59 act as biasing elements that maintains the input member 43 in the stationary rest position. Thus, the input member 43 has a trigger action with the first torsion spring 58 urging the input member 43 to the stationary rest position when the input member 43 is pivoted in the first moving direction B. The second torsion spring 59 urges the input member 43 to the stationary rest position when the input member 43 is pivoted in the second moving direction C. Accordingly, when the shifter 18 is operated, the input member 43 is either pushed or pulled in response to movement of the shift lever 18a of the shifter 18 with the shift lever 18a and the input member 43 both automatically returning to their stationary rest positions.

In particular, the input member 43 includes a base part 43a with a pivot hole and a cable attachment lever 43b extending outwardly from the base part 43a. The cable attachment lever 43b is provided with a cable attachment structure 43c in the form of a hole for attaching the control cable 26 thereto. Accordingly, when the shifter 18 is operated, the cable 26 either pulls or pushes the cable attachment lever 43b such that the input member 43 selectively pivots in either the first moving direction B or the second moving direction C. The positioning plate 48 has the derailleur link member 36a fixedly attached thereto such that the movement of the input member 43 from the shifter 18 is transmitted to the chain guide 34 as explained below.

The input member 43 includes a pair of pivot pins 61 and 62 for pivotally supporting the first and second release pawls 44 and 45. The first release pawl 44 is biased in a counterclockwise direction in FIG. 5 about the pivot pin 61 to contact an abutment 52a formed on the edge of the mounting plate 52 by a torsion spring 63 when the input member 43 is in the neutral rest position. The second release pawl 45 is biased in a clockwise direction in FIG. 5 about the second pivot pin 62 to contact an abutment 52b formed on the edge of the mounting plate 52 by a torsion spring 64 when the input member 43 is in the neutral rest position. Thus, when the input member 43 is in the neutral rest position, the first and second release pawls 44 and 45 are disengaged from the release plate 46. In particular, the first and second release pawls 44 and 45 are normally disengaged from the release plate 46 by projections 44a and 45a that rest on the abutments 52a and 52b when the input member 43 is in the neutral rest position. When the input member 43 is moved from the neutral rest position in the first moving direction B, the projection 44a of the first release pawl 44 rides off of the abutment 52a and then engages the release plate 46. Similarly, when the input member 43 is moved from the neutral rest position in the second moving direction C, the projection 45a of the second release pawl 45 rides off of the abutment 52a and then engages the release plate 46.

As seen in FIG. 7, the release plate 46 is basically a flat metal plate that rotates on the main pivot axle 53. The release plate 46 has a peripheral edge with a set of first ratchet teeth 46a, a set of second ratchet teeth 46b and a set of release teeth 46c. As seen in FIGS. 8 to 14, the release plate 46 is operatively coupled to the first and second restricting members 41 and 42 to selectively disengage the first restricting pawl 41 to enable movement of the positioning plate 48 when the input member 43 is moved from the neutral rest position in the first moving direction B. This movement of the input member 43 in the first moving direction B also causes the release plate 46 to lift the second restricting pawl 42 as the positioning plate 48 moves to the next operating position, and then reengage the first and second restricting pawls 41 and 42 against the positioning plate 48 to prevent rotational movement. Similarly, referring to FIGS. 14 to 21, the second restricting pawl 42 is selectively disengaged from the positioning plate 48 to enable movement of the positioning plate 48 in response to the input member 43 being moved from the neutral rest position in the second moving direction C. This movement of the input member 43 in the second moving direction C also causes the release plate 46 to sequentially lift the first restricting pawl 41 as the positioning plate 48 moves to the next operating position, and then reengage the first and second restricting pawls 41 and 42 against the positioning plate 48 to prevent rotational movement.

More specifically, the first ratchet teeth 46a are selectively engaged by the first release pawl 44 when the input member 43 is moved from the neutral rest position in the first moving direction B so that the movement of the input member 43 in the first moving direction B causes the release plate 46 to also move in the first moving direction B. The second ratchet teeth are selectively engaged by the second release pawl 45 in response to the input member 43 being moved from the neutral position in the second moving direction C so that the movement of the input member 43 in the second moving direction C causes the release plate 46 to also move in the second moving direction C. Thus, the release plate 46 is operatively coupled to the input member 43 via the first and second release pawls 44 and 45. The release teeth 46c selectively engage the first and second restricting members 41 and 42 to selectively disengage the first and second restricting members 41 and 42 from the positioning plate 48 when the input member 43 is moved from the neutral position in the first and second moving directions B and C, respectively.

The release plate 46 also has an arcuate slot 46d and a pair of spring receiving apertures 46e. The slot 46d and receiving apertures 46e are used to control the relative movement between the release plate 46 and the positioning plate 48. In particular, the release plate 46 and the positioning plate 48 are movable relative to each other by a predetermined limited amount in both moving directions B and C. In neutral rest position the release plate 46 is maintained in a neutral position as shown in FIG. 5 by a biasing arrangement that includes a pair of biasing elements in the form of coil compression springs 65. This biasing arrangement is disposed to maintain the release plate 46 in a stationary intermediate position with one of the release teeth 46c disposed between the first and second restricting pawls 41 and 42 when the input member 43 returns to the neutral rest position. In particular, the biasing elements or springs 65 are disposed between the release plate 46 and the positioning plate 48.

As seen in FIG. 7, the positioning plate 48 is basically a flat metal plate that rotates on the main pivot axle 53. The positioning plate 48 has a peripheral edge with a plurality of positioning teeth 48a, a first side with a plurality of projections 48b, a second side with a pin 48c and a pair of spring receiving apertures 48d. The first restricting pawl 41 contacts one side of one of the positioning teeth 48a to restrict movement of the positioning plate 48 in the first moving direction B when the input member 43 is in the neutral rest position, while the second restricting pawl 42 contacts the other side one of the positioning teeth 48a to restrict movement of the positioning plate 48 in the second moving direction C when the input member 43 is in the neutral rest position. The projections 48b engage recesses in the link member 36a so that the link member 36a and the positioning plate 48 move together. The pin 48c is disposed in the slot 46d of the release plate 46 so that the positioning plate 48 is movably coupled with respect to the release plate 46 through a limited range of movement. In particular, the slot 46d of the release plate 46 and the pin 48c of the positioning plate 48 are dimensioned so that the release plate 46 initially moves with respect to the positioning plate 48 as seen in FIGS. 8 to 10 and FIGS. 14 to 16. This allows for one of the first and second restricting pawls 41 and 42 to be lifted out of the path of the positioning teeth 48a. When the input member 43 is rotated in the first moving direction B and the pin 48c hits one end of the slot 46d, the release plate 46 and the positioning plate 48 rotate together such that the next one of the positioning teeth 48a moves between the first and second restricting pawls 41 and 42. Thus, the first and second restricting pawls 41 and 42 are sequentially lifted to perform a shifting operation.

Figure 10:
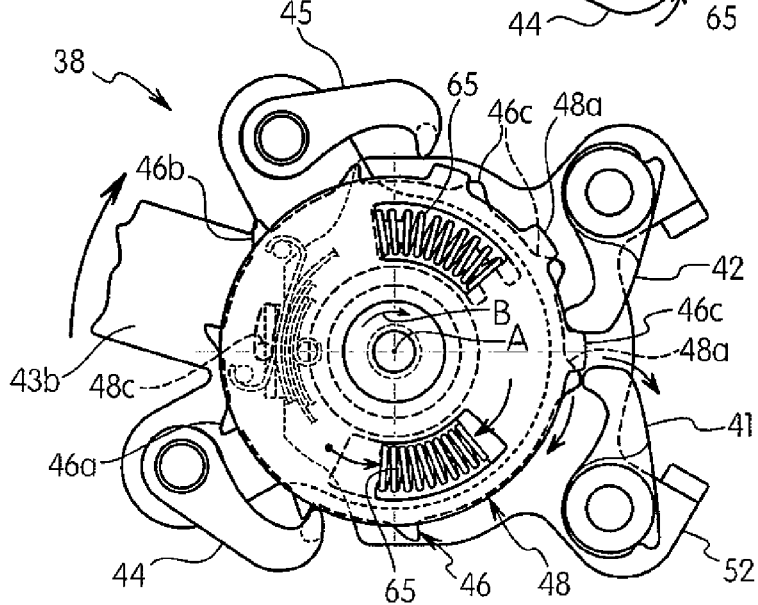
FIG. 10 is a simplified top plan view of selected parts of the positioning device with the input member being moved in the first moving direction from the position shown in FIG. 9 to a position in which one of the release teeth of the release member initially engages the first restricting member or pawl.
Figure 11:
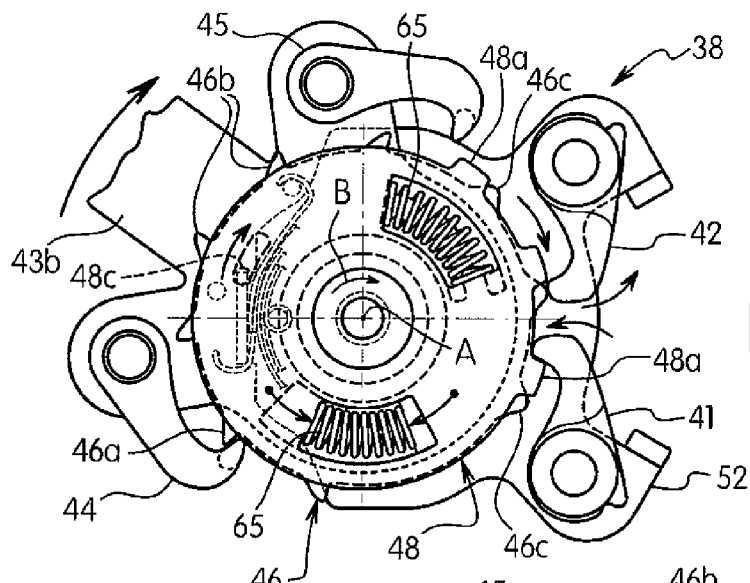
FIG. 11 is a simplified top plan view of selected parts of the positioning device with the input member being moved in the first moving direction from the position shown in FIG. 10 to a position in which the prior one of the positioning teeth has moved out of from between the first and second restricting members or pawls and one of the release teeth of the release member initially engages the second restricting member or pawl.
Figure 12:
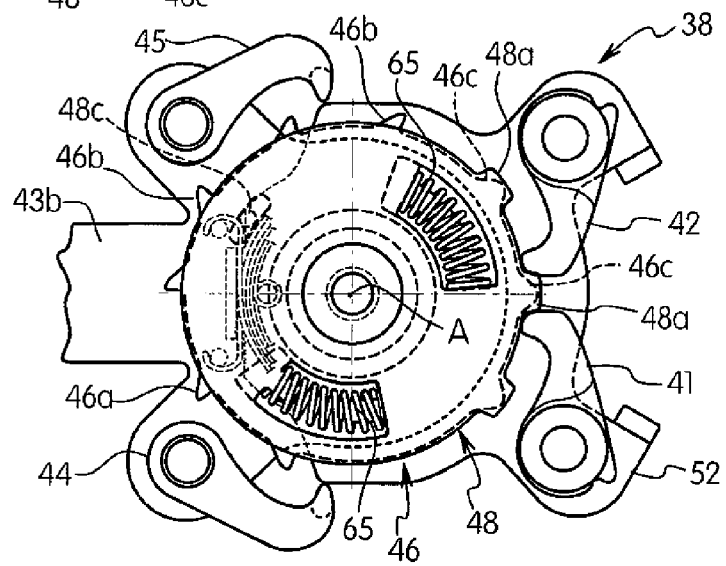
FIG. 12 is a simplified top plan view of selected parts of the positioning device with the input member has returned to its neutral rest from the position in shown in FIG. 11 such that which the positioning device is in the second or middle operating position.

The biasing elements or springs 65 are disposed in the spring receiving apertures 46e and 48d to maintain the release plate 46 in a stationary intermediate position with one of the release teeth 46c disposed between the first and second restricting pawls 41 and 42 when the input member 43 returns to the neutral rest position. In the neutral rest position, the release teeth 46c and the positioning teeth 48a are also aligned. One of the springs 65 is compressed during initial movement of the input member 43 because the first and second restricting pawls 41 and 42 prevent the positioning plate 48 from initially rotating with the release plate 46. When the positioning plate 48 reaches the position as seen in FIG. 10, the positioning plate 48 is disengaged from the first restricting pawl 41. However, since the positioning plate 48 is biased by a torsion spring 70 in the second moving direction C and the force exerted by the spring 70 is greater than the force generated by compression of the spring 65, the positioning plate 48 cannot move in the first moving direction B by itself. Therefore when the input member 43 is rotated in the first moving direction B further from FIG. 11, the pin 48c of the positioning plate 48 is driven by the release plate 46 until the next one of the positioning teeth 48a comes into a position between the first and second restricting pawls 41 and 42. When an operating force exerted on the input member is removed, the positioning plate 48 moves back to the intermediate position as shown in FIG. 12.

Figure 8:
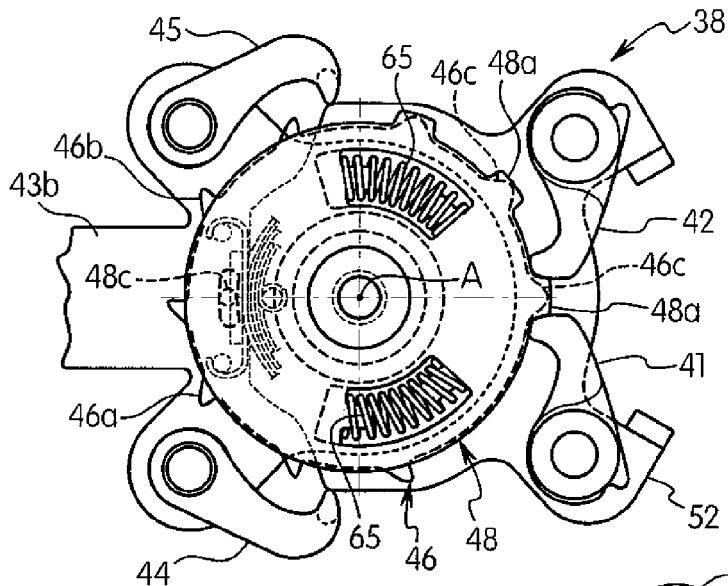
FIG. 8 is a simplified top plan view of selected parts of the positioning device with the input member in a first neutral rest position in which the positioning device is in a first operating position that corresponds to the retracted position of the chain guide and in which one of the positioning teeth is located between the first and second restricting members or pawls to prevent rotational movement of the positioning member or plate.
Figure 14:
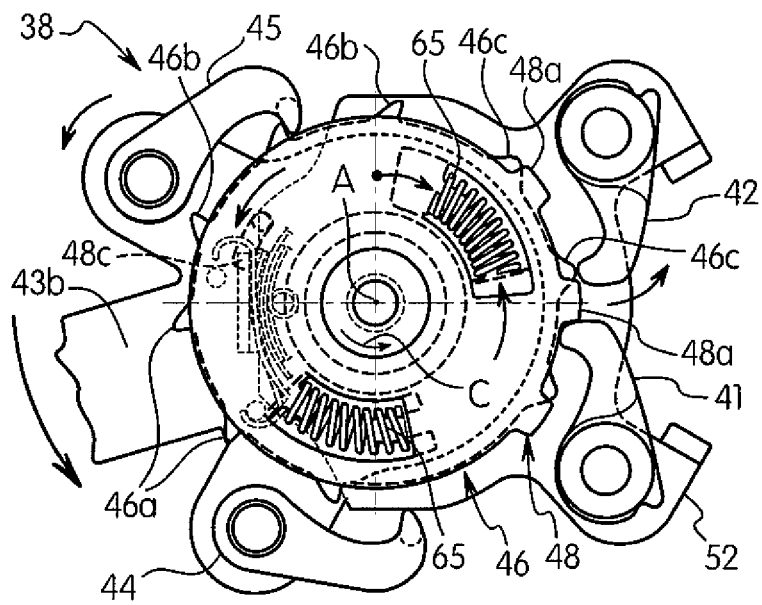
FIG. 14 is a simplified top plan view of selected parts of the positioning device with the input member being moved in the second moving direction from the position shown in FIG. 13 to a position in which one of the release teeth of the release member initially engages the second restricting member or pawl.
Figure 15:
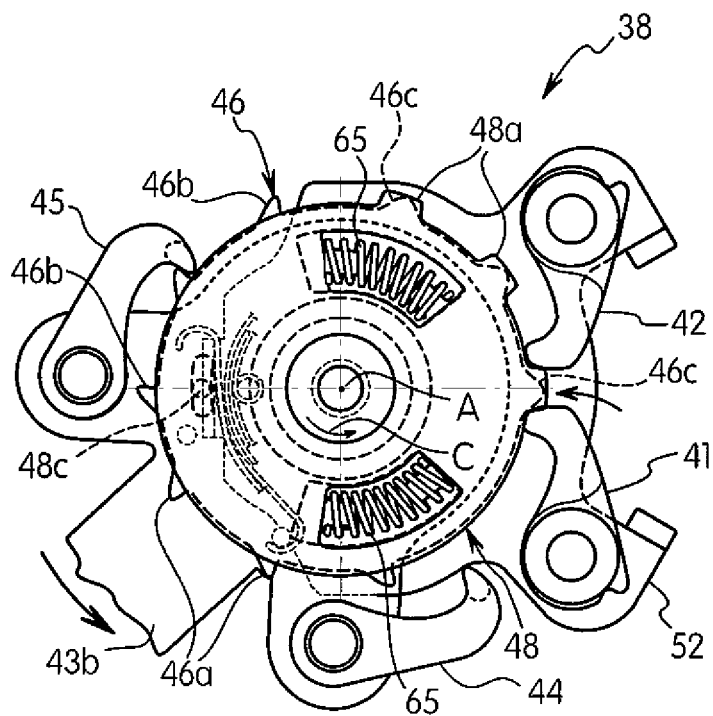
FIG. 15 is a simplified top plan view of selected parts of the positioning device with the input member being moved further in the second moving direction from the position shown in FIG. 14 such that relative movement occurs between the release member and the positioning member with one of the release teeth of the release member lifting the first restricting member or pawl.

As mentioned above the positioning plate 48 is also biased in a counterclockwise direction in FIG. 5 (second moving direction C) by the torsion spring 70 that has one end coupled to the link member 36a and the other end coupled to the housing part 51. The spring 70 prevents the positioning plate 48 from getting stuck in an intermediate position as seen in FIG. 11. In other words, if the input member 43 is only partially moved in the first moving direction B to the position as seen in FIG. 11, then the spring 70 will return the positioning plate 48 back to the position as seen in FIG. 8. Due to the strong spring force by the spring 70, when the second restricting pawl 42 is disengaged from one of the positioning teeth 48a as seen in FIG. 14, the positioning plate 48 and the release plate 46 rotate in the second moving direction C immediately and next positioning is instantly completed as shown in FIG. 15.

Figure 16:
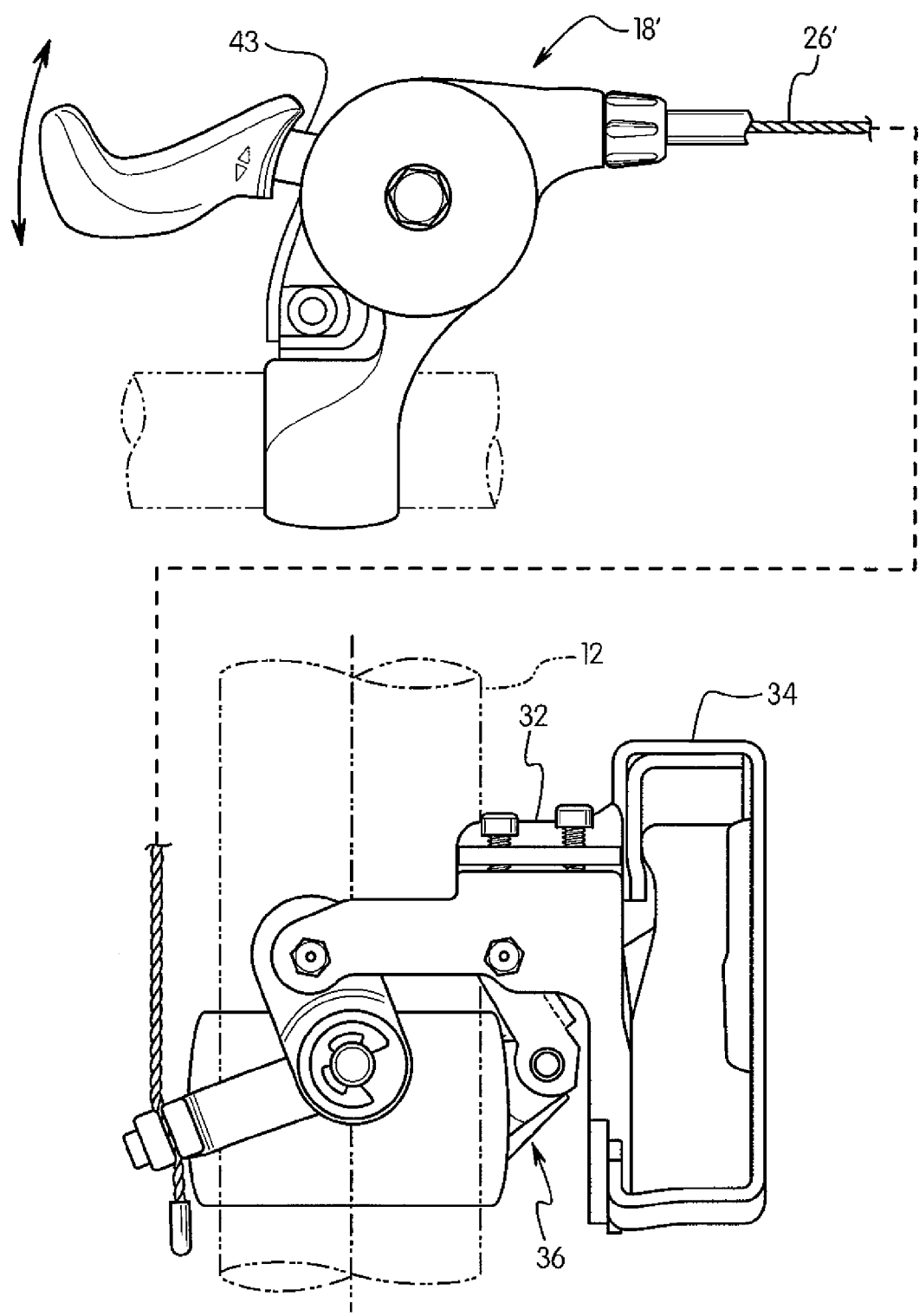
FIG. 16 is a schematic view of a front shifting system with a front shifter shown in top plan that is equipped with the position device of the present invention and a conventional front derailleur shown in rear elevation when the chain guide in a fully retracted position.
Figure 17:
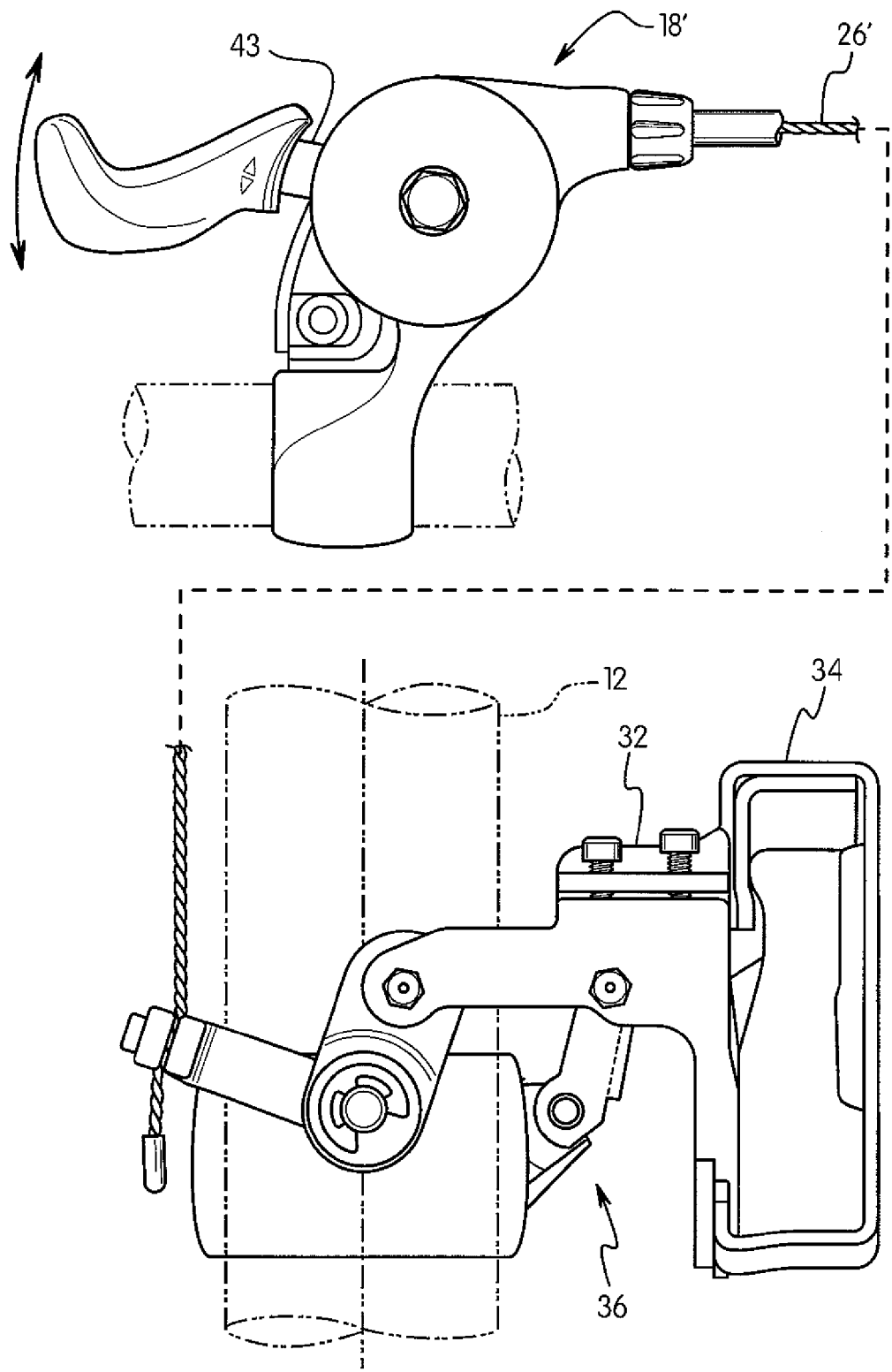
FIG. 17 is a schematic view of the front shifting system with the front shifter of the present invention shown in top plan and the conventional front derailleur shown in rear elevation when the chain guide in a fully extended position.
Figure 18:
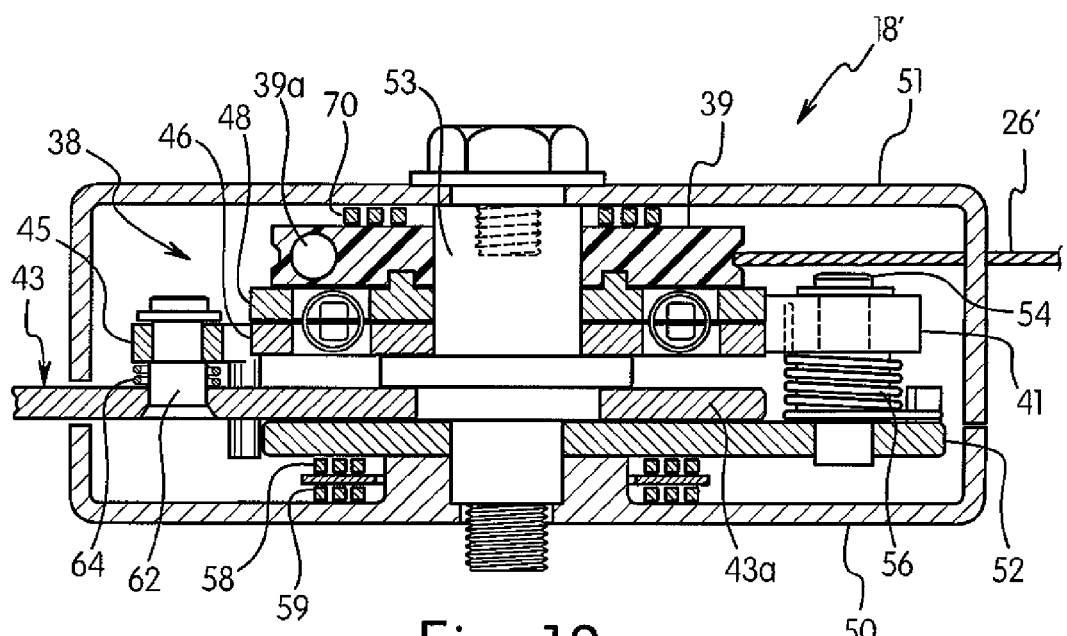
FIG. 18 is a cross sectional view, similar to FIG. 6, of selected parts of the positioning device of the front shifter illustrated in FIGS. 16 and 17.

Referring now to FIGS. 16 to 18, a shifter 18' is illustrated that utilizes the bicycle component position device 38 in accordance with the present invention. When the bicycle component position device 38 is used in a shifter, the link member 36a is replaced with a wire takeup member 39 that is fixed to move with the positioning plate 48. Thus, the identical parts will be given the same reference numerals. Moreover, the descriptions of the bicycle component position device 38 as applied to the shifter 18' will be omitted for the sake of brevity, since the descriptions are the same as when the bicycle component position device 38 as applied to the front derailleur 22.

Here, the input member 43 constitutes a rider shift control operable lever, which moves the positioning plate 48 and the wire takeup member 39. The wire takeup member 39 has a wire connection point 39a for attaching one end of an inner wire of a flexible control cable 26' thereto. The other end of the inner wire of the flexible control cable 26' is attached to a link member of the front derailleur 22. Thus, the positioning plate 48 is operatively coupled to the derailleur chain guide 34 via the flexible control cable 26' to move the chain guide 34 between a retracted position and an extended position in response to the input member 43 being moved from the neutral position in the first and second moving directions B and C.

Now, the operation of the bicycle component position device 38 will be discussed, which applies to both when the bicycle component position device 38 used with the front derailleur 22 and when the bicycle component position device 38 used within the shifter 18'.

Figure 9:
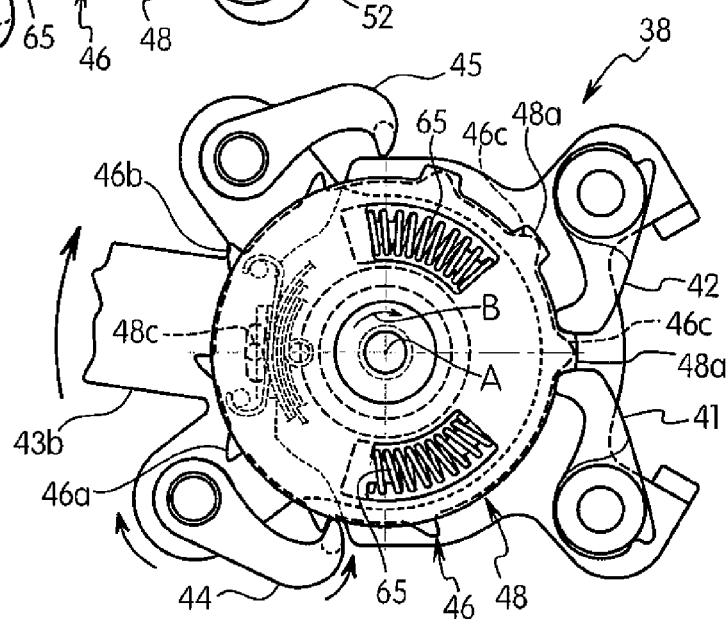
FIG. 9 is a simplified top plan view of selected parts of the positioning device with the input member being initially moved in the first moving direction from the neutral rest position to a position in which the first release pawl initially engages one of the ratchet teeth of the release member.

As seen in FIG. 8, with the input member 43 in the neutral rest position in which the positioning device 38 is in a first operating position that corresponds to the retracted position of the chain guide 34, a first one of the positioning teeth 48a and a first one of the release teeth 46c are located between the first and second restricting members or pawls 41 and 42 to prevent rotational movement of the positioning plate 48. Then when the input member 43 is initially moved in the first moving direction B from the neutral rest position to a position in which the first release pawl 44 initially engages one of the ratchet teeth 46a of the release plate 46, as seen in FIG. 9, the release plate 46 and the positioning plate 48 remains stationary. Once the first release pawl 44 is engaged one of the ratchet teeth 46a of the release plate 46, the release plate 46 moves with respect to the positioning plate 48 which remains stationary as seen in FIG. 10. This movement of the release plate 46 by the input member 43 in the first moving direction B results in one of the release teeth 46c of the release member 46 lifting the first restricting pawl 41 as seen in FIG. 10 to a disengagement position. In this position with the first restricting pawl 41 lifted, the pin 48c of the positioning plate 48 engage an end of the slot 46d in the release plate 46 so that the positioning plate 48 is driven in the first moving direction B with the release plate 46. Now, further movement of the release plate 46 by the input member 43 in the first moving direction B results in the first restricting pawl 41 riding over one of the positioning teeth 48a and the second restricting pawl 42 to be lifted by another one of the release teeth 46c of the release member 46 as seen in FIG. 11. Thus, the prior one of the positioning teeth 48a has moved out of from between the first and second restricting pawls 41 and 42. Further movement of the release plate 46 by the input member 43 in the first moving direction B then results in the next one of the positioning teeth 48 being located between the first and the second restricting pawls to prevent rotational movement of the positioning plate 48.

As seen in FIG. 12 to 15, movement of the input member 43 in the second moving direction C is illustrated. Rotation of the input member 43 in the second moving direction C operates the parts in basically the same way as rotation of the input member 43 in the first moving direction B, but for opposite ones of the pawls 41, 42, 44 and 45 are moved.

Figure 13:
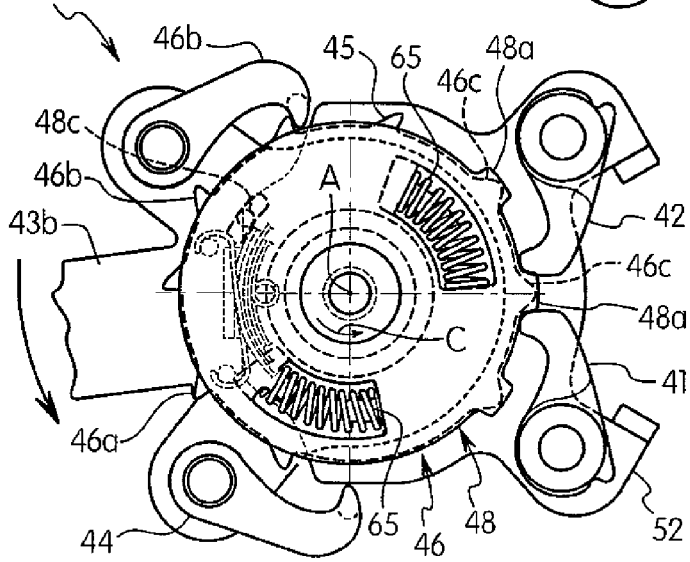
FIG. 13 is a simplified top plan view of selected parts of the positioning device with the input member being initially moved in the second moving direction from the neutral rest position in FIG. 12 to a position in which the second release member or pawl initially engages one of the second ratchet teeth of the release member.

As seen in FIG. 12, with the input member 43 in the neutral rest position in which the positioning device 38 is in a second operating position that corresponds to the middle position of the chain guide 34, a second one of the positioning teeth 48a and a second one of the release teeth 46c are located between the first and second restricting members or pawls 41 and 42 to prevent rotational movement of the positioning plate 48. Then when the input member 43 is initially moved in the second moving direction C from the neutral rest position to a position in which the second release pawl 45 initially engages one of the ratchet teeth 46b of the release plate 46, as seen in FIG. 13, the release plate 46 and the positioning plate 48 remains stationary. Once the second release pawl 45 is engaged one of the ratchet teeth 46b of the release plate 46, the release plate 46 moves with respect to the positioning plate 48 which remains stationary as seen in FIG. 14. This movement of the release plate 46 by the input member 43 in the second moving direction C results in one of the release teeth 46c of the release member 46 lifting the second restricting pawl 42 as seen in FIG. 14 to a disengagement position. Due to the strong spring force by the spring 70, when the second restricting pawl 42 is disengaged from one of the positioning teeth 48a as seen in FIG. 14, the positioning plate 48 and the release plate 46 rotate in the second moving direction C immediately and next positioning is instantly completed as shown in FIG. 15.

In the illustrated embodiments, the input member 43 is illustrated as a single one-piece member, however it is obvious for the skilled in the art to modify the input member having two separate input portions moving in the first and second moving directions, respectively. In this case, two cables, or two hydraulic or pneumatic actuating lines are operatively coupled to the input portions, respectively.

In the illustrated embodiments, single-step shifting during a single shifting operation is described. However it is obvious for the skilled in the art from this disclosure to modify the positioning device such that multiple-step shifting during a single shifting operation is achieved.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component positioning device comprising:
   a fixed structure;
   a positioning member movably coupled with respect to the fixed structure;
   a first restricting member operatively engaged with the positioning member to only restrict movement of the positioning member in a first moving direction when the positioning member is in one of predetermined positions; and
   a second restricting member operatively engaged with the positioning member to only restrict movement of the positioning member in a second moving direction when the positioning member is in one of predetermined positions, with the first and second restricting members being independently movable with respect to each other and being both biased toward engagement with the positioning member while the first and second restricting members are at rest positions, and the first and second restricting members engaging the positioning member while the first and second restricting members are at the rest positions.

2. The bicycle component positioning device according to claim 1, further comprising
   an input member pivotally coupled with respect to the fixed structure to move about a pivot axis in the first moving direction and the second moving direction.

3. The bicycle component positioning device according to claim 2, wherein
   the input member is biased to a neutral rest position.

4. The bicycle component positioning device according to claim 2, wherein
   the input member includes a rider shift control operable lever, and the positioning member has a wire take up member attached thereto.

5. The bicycle component positioning device according to claim 1, further comprising
   an input member movably coupled with respect to the fixed structure; and
   a release member operatively coupled to the first and second restricting members to selectively disengage the first restricting member to enable movement of the positioning member in response to movement of the input member and to selectively disengage the second restricting member to enable movement of the positioning member in response to movement of the input member.

6. The bicycle component positioning device according to claim 5, wherein
   the positioning member is movably coupled with respect to the release member through a limited range of movement.

7. The bicycle component positioning device according to claim 5, wherein
   the input member includes a first release pawl normally disengaged from the release member, and a second release pawl normally disengaged from the release member, with the first release pawl engaging the release member when the input member is moved in the first moving direction and the second release pawl engaging the release member in response to the input member in the second moving direction.

8. The bicycle component positioning device according to claim 7, wherein
   the first and second release pawls are independently movable with respect to each other.

9. The bicycle component positioning device according to claim 7, wherein
   the release member includes a set of first ratchet teeth that are selectively engaged by the first release pawl when the input member is moved in the first moving direction, a set of second ratchet teeth that are selectively engaged by the second release pawl when the input member is moved in the second moving direction, and a set of release teeth that selectively engage the first and second restricting members to selectively disengage the first and second restricting members from the positioning member when the input member is moved in the first and second moving directions, respectively.

10. The bicycle component positioning device according to claim 9, further comprising
    a biasing arrangement disposed to maintain the release member in a stationary intermediate position with one of the release teeth disposed between the first and second restricting members when the positioning member is in one of the predetermined positions.

11. The bicycle component positioning device according to claim 10, wherein
    the biasing arrangement includes a pair of biasing elements disposed between the release member and the positioning member.

12. The bicycle component positioning device according to claim 5, wherein
    the positioning member includes an engagement element that is configured and arranged to engage the release member such that the release member and the positioning member move together after the first restricting member is disengaged from the positioning member when the input member is moved in the first moving direction, and such that the release member and the positioning member move together after the second restricting member is disengaged from the positioning member when the input member is moved in the second moving direction.

13. The bicycle component positioning device according to claim 5, wherein
    the input member, the release member and the positioning member are mounted to rotate about a single pivot axis.

14. The bicycle component positioning device according to claim 5, wherein
    the positioning member includes a wire takeup member operatively coupled thereto.

15. The bicycle component positioning device according to claim 5 wherein
    the input member includes a rider operable shift control lever pivotally coupled to the fixed structure.

16. The bicycle component positioning device according to claim 1, wherein
    the first and second restricting members engage a same tooth of the positioning member while the first and second restricting members are at the rest positions.

17. A bicycle component positioning device comprising:
    a fixed structure;
    a positioning member movably coupled with respect to the fixed structure;
    a first restricting member operatively engaged with the positioning member to only restrict movement of the positioning member in a first moving direction when the positioning member is in one of predetermined positions;
    a second restricting member operatively engaged with the positioning member to only restrict movement of the positioning member in a second moving direction when the positioning member is in one of predetermined positions, with the first and second restricting members being independently movable with respect to each other and being both biased toward engagement with the positioning member while the first and second restricting members are at rest positions; and an input member pivotally coupled with respect to the fixed structure to move about a pivot axis in the first moving direction and the second moving direction, the input member including a cable attachment lever with a cable attachment structure, and the positioning member has a derailleur link member fixedly attached thereto.

18. A bicycle component positioning device comprising:

a fixed structure;

a positioning member movably coupled with respect to the fixed structure, the positioning member including a derailleur chain guide operatively coupled thereto for movement between a retracted position and an extended position;

a first restricting member operatively engaged with the positioning member to only restrict movement of the positioning member in a first moving direction when the positioning member is in one of predetermined positions;

a second restricting member operatively engaged with the positioning member to only restrict movement of the positioning member in a second moving direction when the positioning member is in one of predetermined positions, with the first and second restricting members being independently movable with respect to each other and being both biased toward engagement with the positioning member while the first and second restricting members are at rest positions;

an input member movably coupled with respect to the fixed structure; and a release member operatively coupled to the first and second restricting members to selectively disengage the first restricting member to enable movement of the positioning member in response to movement of the input member and to selectively disengage the second restricting member to enable movement of the positioning member in response to movement of the input member.

19. A bicycle component positioning device comprising:

a fixed structure;

a positioning member movably coupled with respect to the fixed structure;

a first restricting member operatively engaged with positioning member to only restrict movement of the positioning member in a first moving direction when the positioning member is in one of predetermined positions;

a second restricting member operatively engaged with the positioning member to only restrict movement of the positioning member in a second moving direction when the positioning member is in one of predetermined positions, with the first and second restricting members being independently movable with respect to each other and being both biased toward engagement with the positioning member while the first and second restricting members are at rest positions;

an input member movably coupled with respect to the fixed structure, the input member including a cable attachment structure to pivot the input member with respect to the fixed structure; and a release member operatively coupled to the first and second restricting members to selectively disengage the first restricting member to enable movement of the positioning member in response to movement of the input member and to selectively disengage the second restricting member to enable movement of the positioning member in response to movement of the input member.

* * * * *